(12) United States Patent
Richerson et al.

(10) Patent No.: US 11,319,818 B2
(45) Date of Patent: May 3, 2022

(54) AIRFOIL FOR A TURBINE ENGINE INCORPORATING PINS

(71) Applicant: Siemens Energy Global GmbH & Co. KG, Munich (DE)

(72) Inventors: Lara Richerson, Charlottesville, VA (US); Jose L. Rodriguez, Longwood, FL (US); Timothy Troyer, Charlottesville, VA (US); Louis Charles, Charlottesville, VA (US); Ian T. Doran, Charlottesville, VA (US)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 17/258,480

(22) PCT Filed: Jul. 13, 2018

(86) PCT No.: PCT/US2018/042113
§ 371 (c)(1),
(2) Date: Jan. 7, 2021

(87) PCT Pub. No.: WO2020/013863
PCT Pub. Date: Jan. 16, 2020

(65) Prior Publication Data
US 2021/0156264 A1 May 27, 2021

(51) Int. Cl.
*F01D 5/18* (2006.01)

(52) U.S. Cl.
CPC ........ *F01D 5/187* (2013.01); *F05D 2240/304* (2013.01); *F05D 2250/14* (2013.01);
(Continued)

(58) Field of Classification Search
CPC ............... F01D 5/187; F05D 2240/304; F05D 2250/14; F05D 2250/291; F05D 2250/75; F05D 2260/22141; F05D 2260/2212
See application file for complete search history.

(56) References Cited

U.S. PATENT DOCUMENTS

| 7,186,084 B2 | 3/2007 | Bunker et al. |
| 2018/0015536 A1 | 1/2018 | Merrill et al. |

FOREIGN PATENT DOCUMENTS

EP 3040516 A1 7/2016

OTHER PUBLICATIONS

PCT International Search Report and Written Opinion of International Searching Authority dated Mar. 14, 2019 corresponding to PCT International Application No. PCT/US2018/042113 filed Jul. 13, 2018.

*Primary Examiner* — Courtney D Heinle
*Assistant Examiner* — Andrew Thanh Bui

(57) ABSTRACT

An airfoil for a turbine engine includes an array of pins positioned in an internal cavity of the airfoil, such that cooling channels are defined in the interspaces between adjacent pins. Each pin extends lengthwise from a first airfoil wall to a second airfoil wall and is connected thereto at a first intersection and at a second intersection respectively. The pin has a first cross-sectional shape at a respective intersection and a second cross-sectional shape at an intermediate plane located between the first and second intersections. The first cross-sectional shape includes a closed shape defined by relatively sharp corners and the second cross-sectional shape includes a closed shape defined by relatively rounded corners. A cross-sectional area of the pin at the intermediate plane is greater than a cross-sectional area of the pin at the respective intersection.

14 Claims, 6 Drawing Sheets

(52) U.S. Cl.
CPC .... *F05D 2250/291* (2013.01); *F05D 2250/75* (2013.01); *F05D 2260/22141* (2013.01)

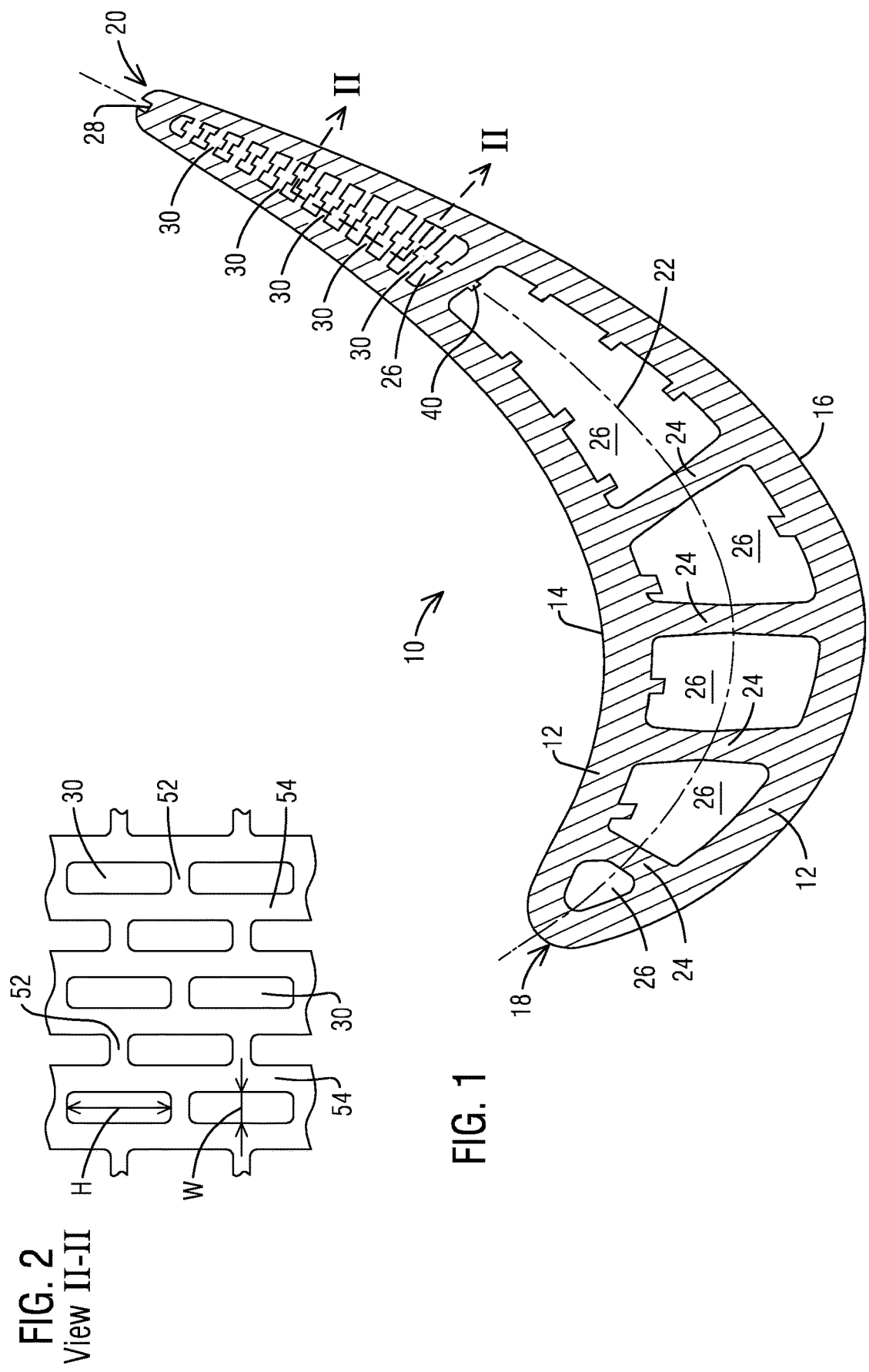

View IV-IV

View V-V

AIRFOIL FOR A TURBINE ENGINE INCORPORATING PINS

BACKGROUND

1. Field

This invention relates generally to an airfoil in a turbine engine, and in particular, to cooling features in a turbine airfoil.

2. Description of the Related Art

A gas turbine engine typically includes a compressor section for compressing ambient air, a combustor section for mixing the compressed air with fuel and igniting the mixture to form a hot working medium fluid and a turbine section for expanding the working medium fluid for extracting power from the working medium fluid. The turbine section typically comprises multiple turbine stages, each stage having a row of stationary vanes upstream of a row of rotating blades.

The airfoils of the vanes and blades that are exposed to high operating temperatures need to be cooled, in order to prolong component life. A portion of the compressed air discharged from the compressor section, which is relatively cooler, may be diverted for cooling the turbine airfoils. Effective cooling of turbine airfoils requires delivering the relatively cool air to critical regions, such as along the trailing edge of a turbine blade or a stationary vane. Airfoils commonly include internal cooling channels, which remove heat from the pressure sidewall and the suction sidewall in order to minimize thermal stresses. Achieving a high cooling efficiency based on the rate of heat transfer is a significant design consideration in order to minimize the volume of cooling air diverted from the compressor for cooling.

Turbine airfoils are often manufactured by a casting process involving a casting core, typically made of a ceramic material, which defines the internal cooling channels.

SUMMARY

Briefly, aspects of the present invention relate to turbine airfoil cooling features incorporating pins having a hybrid geometry, which provide improved heat transfer and pressure drop, thereby reducing cooling flow requirement. Aspects of the present invention may reduce manufacturing complexities, especially in case of turbine airfoils manufactured by casting.

According to an aspect of the present invention, an airfoil for a turbine engine is provided. The airfoil comprises a first airfoil wall and a second airfoil wall delimiting an internal cavity. An array of pins is positioned in the internal cavity, whereby cooling channels are defined in the interspaces between adjacent pins of the array. Each pin extends lengthwise from the first airfoil wall to the second airfoil wall, the pin being connected to the first airfoil wall at a first intersection and connected to the second airfoil wall at a second intersection. An intermediate plane perpendicular to a lengthwise direction is defined at a location between the first intersection and the second intersection. The pin has a first cross-sectional shape at a respective intersection and a second cross-sectional shape at the intermediate plane. The first cross-sectional shape includes a closed shape defined by relatively sharp corners and the second cross-sectional shape includes a closed shape defined by relatively rounded corners. A cross-sectional area of the pin at the intermediate plane is greater than a cross-sectional area of the pin at the respective intersection.

BRIEF DESCRIPTION OF THE DRAWINGS

The invention is shown in more detail by help of figures. The figures show preferred configurations and do not limit the scope of the invention.

FIG. 1 is a cross-sectional view, looking in a radial direction, of a turbine airfoil, according to aspects of the present invention;

FIG. 2 is an internal view of a trailing edge portion of the turbine airfoil of FIG. 1 along the section II-II, illustrating an array of pins according to a first example configuration;

DETAILED DESCRIPTION

Figure 3:
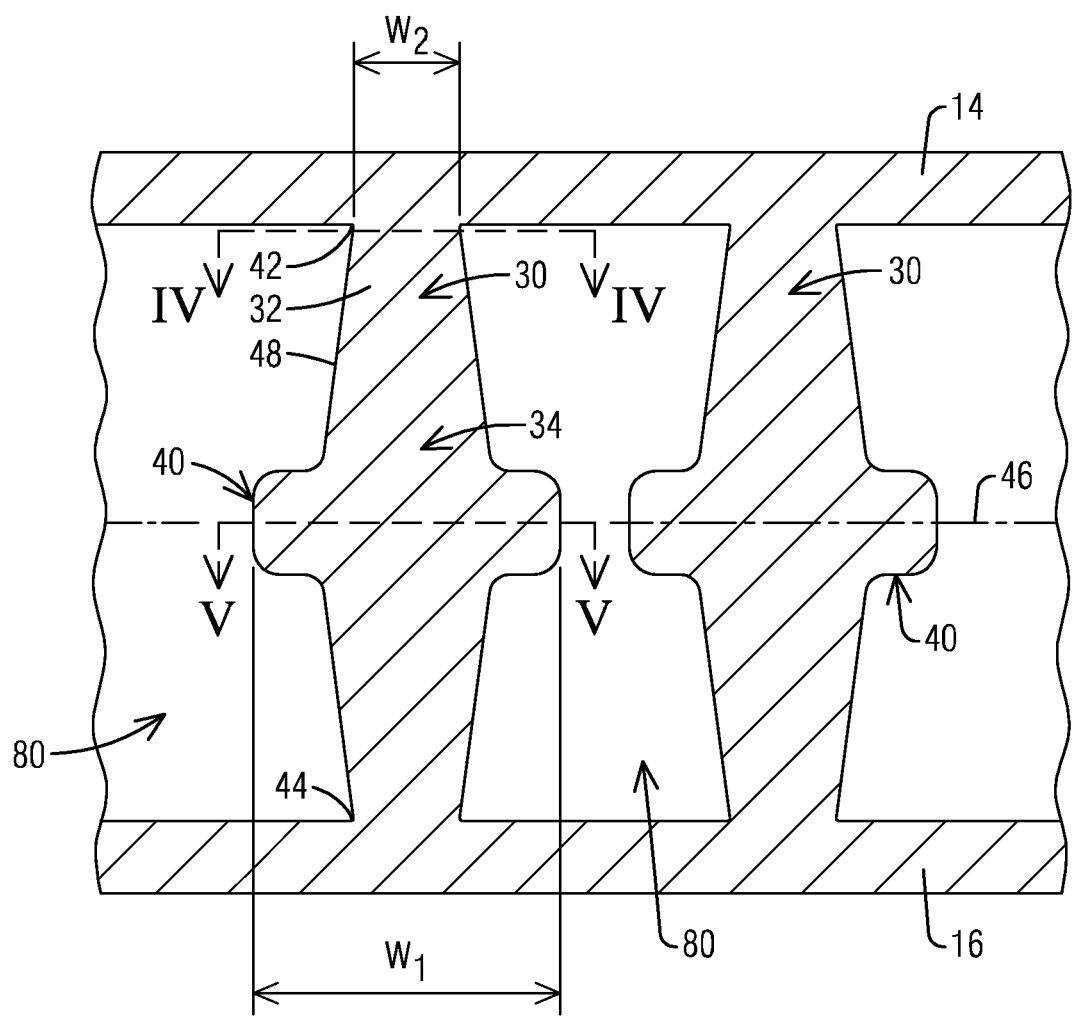
FIG. 3 illustrates a hybrid pin according to a first embodiment of the present invention.

In the following detailed description of the preferred embodiments, reference is made to the accompanying drawings that form a part hereof, and in which is shown by way of illustration, and not by way of limitation, a specific embodiment in which the invention may be practiced. It is to be understood that other embodiments may be utilized and that changes may be made without departing from the spirit and scope of the present invention.

Referring to FIG. 1, a turbine airfoil 10 may comprise an outer wall 12 which extends span-wise in a radial direction in relation to a rotational axis of a turbine section of a gas turbine engine. The radial or span-wise direction is perpendicular to the plane of FIG. 1. The outer wall 12 is formed by a generally concave pressure side wall 14 and a generally convex suction side wall 16. The pressure side wall 14 and the suction side wall 16 are joined at a leading edge 18 and at a trailing edge 20. A chord-wise axis 22 of the airfoil section may be defined extending centrally between the pressure side wall 14 and the suction side wall 16 from the leading edge 18 to the trailing edge 20. As shown, the airfoil 10 may comprise internal partition walls or ribs 24 which connect the pressure and suction side walls 14, 16 to define internal cavities 26. The cavities 26 extend radially to form internal cooling passages.

In the illustrated embodiment, the airfoil 10 is part of a rotatable turbine blade. It should however be noted that aspects of the invention could additionally be incorporated into airfoils of stationary turbine vanes. In the present example, a cooling fluid, for example compressed air diverted from a compressor section of the turbine engine, may enter one or more of the internal cavities 26 via openings provided in the root of the blade. In various configurations, some of the internal cavities 26 may form part of one or more serpentine cooling circuits, whereby the cooling fluid is conducted serially in alternating radial directions. The aft-most internal cavity 26 adjacent to the trailing edge 20, also referred to as a trailing edge cavity, may comprise an arrangement of internal cooling features 30 (shown in greater detail in FIG. 2). The cooling fluid may traverse axially (i.e., in the chord-wise direction) through the arrangement of cooling features before leaving the airfoil 10 via exit slots 28 arranged along the trailing edge 20.

Conventional trailing edge cooling features included a series of impingement plates, typically two or three in number, arranged next to each other along the axial or chord-wise direction. However, this arrangement provides that the cooling fluid travels only a short distance before exiting the airfoil at the trailing edge. It may be desirable to have a longer cooling flow path along the trailing edge portion to have more surface area for transfer of heat, to improve cooling efficiency.

As shown in FIG. 2, the trailing edge cavity 26 of the illustrated embodiment comprises an array of cooling features 30, which may be embodied as pins. Each pin 30 extends from the pressure side wall 14 to the suction side wall 16 (see FIG. 1). The array may be formed of a number of span-wise or radially extending rows of pins 30, the rows being arranged next to each other along the axial or chord-wise direction. The pins 30 of each row are spaced in the radial direction such that axially extending cooling channels 52 are defined between adjacent pins 30 of a row. The rows are spaced in the axial direction such that radially extending cooling channels 54 are defined between adjacent pins 30 of neighboring rows. The axial and radial channels 52, 54 extend (in cross-section) from the pressure side wall 14 to the suction side wall 16 and are fluidically interconnected to lead a pressurized cooling fluid in a generally axial direction toward the trailing edge exit slots 28 (shown FIG. 1). In particular, the pressurized cooling fluid flows generally forward-to-aft impinging serially on to the rows of pins 30, leading to a transfer of heat to the cooling fluid accompanied by a drop in pressure of the cooling fluid. The pins 30 of adjacent rows may be staggered in the span-wise direction to facilitate such a serial impingement.

In particular, the pin array may be made up of a large number of rows of pins 30 having an elongated cross-sectional shape, to provide a high pressure drop, thereby reducing cooling flow requirement, while also providing a high heat transfer. As shown in FIG. 2, each pin 30 may have a height dimension H and a width dimension W along orthogonal axes, such that the height dimension H is much larger than the width dimension W. In the example shown here, the pins 30 have a generally rectangular cross-sectional shape. However, aspects of the present invention are not limited to a particular cross-sectional shape of the pin or configuration of the array. The inventive idea may be extended to several example pin shapes and array configurations, some of which are disclosed in the International Patent Application No. PCT/US2017/013892, filed on Jan. 18, 2017 by the present Applicant, titled "Turbine Element for High Pressure Drop and Heat Transfer".

It has been observed that a high pressure drop may be achieved by pins having a cross-sectional shape defined by sharp corners, such as a rectangular shape, among others. The present inventors have recognized that manufacturing pins having sharp corners by a casting process may pose a challenge in the cleanup of flash when producing a ceramic casting core, thereby increasing manufacturing complexity. A possible solution for the above is to use a more rounded shape of the pins, such as one with a "racetrack" shaped cross-section instead of a sharp rectangle. The inventors have determined that such rounded shapes, while easing flash cleanup, may lead to a loss of cooling efficiency due to a reduction in pressure drop, as compared to a pin shape with sharp corners.

Embodiments of the present invention disclosed hereinafter provide various hybrid pin geometries, which provide a high pressure drop and heat transfer, while also reducing manufacturing complexities, particularly in the context of casting. It should however be appreciated that the described embodiments are not limited to a particular type of manufacturing process, and may also apply to turbine airfoils manufactured by other processes, such as by additive manufacturing.

Referring now to FIG. 3, a first embodiment of a hybrid pin 30 is illustrated. The pin 30 extends from a first airfoil wall to a second airfoil wall that delimit an internal cavity of the airfoil. In this embodiment, the first airfoil wall is a pressure side wall 14 and the second airfoil wall is a suction side wall 16 of the airfoil 10. The pin 30, in this case, is part of a pin array located in a trailing edge cavity 26 delimited by the pressure and suction side walls 14 and 16 (see FIG. 1). In various embodiments (not shown herein), an array of hybrid pins 30 as illustrated herein, may be provided in other airfoil cooling locations, such as in a leading edge cavity, or in a mid-chord cavity, or in a near wall passage in a multi-wall airfoil, among others. The general geometry as described for the pin 30 may apply to a plurality of pins of the pin array. It may be appreciated that the pressure side wall 14 and the suction side wall 16 of the airfoil 10 are typically not parallel to each other, as may be understood from FIG. 1.

As shown in FIG. 3, the pin 30 extends lengthwise from the first airfoil wall 14 to the second airfoil wall 16. The pin 30 is connected to the first airfoil wall 14 at a first intersection 42 and to the second airfoil wall 16 at a second intersection 44. An intermediate plane 46 may be defined, which is perpendicular to the lengthwise direction and located between the first intersection 42 and the second intersection 44. The location of the intermediate plane 46 may correspond to a parting line in the manufacture of the casting core, where the flash has been observed to be formed. In one example, the intermediate plane 46 may be located midway between the first intersection 42 and the second intersection 44.

A first feature of the hybrid pin 30 is that the cross-sectional shape of the pin 30 varies along a length of the pin 30. The pin 30 may be said to be made up of two sections located on opposite sides of the intermediate plane 46. In each section, the pin 30 has a first cross-sectional shape (examples shown in FIGS. 4 and 10) at a respective intersection 42, 44, and a second cross-sectional shape (examples shown in FIGS. 5 and 11) at the intermediate plane 46. As illustrated herein, the first cross-sectional shape includes a closed shape defined by relatively sharp corners, and the second cross-sectional shape includes a closed shape defined by relatively rounded corners. Along the lengthwise direction, each section of the pin 30 may comprise a first portion 32 located adjacent to the respective intersection 42, 44 and a second portion 34 located adjacent to the intermediate plane 46. In the example shown in FIG. 3, the cross-sectional shape of the first portion 32 corresponds to the first cross-sectional shape defined by relatively sharp corners. That is to say that the pin 30 comprises sharp corners along the length of the first portion 32. In the second portion 34, the shape of the pin 30 transitions into a more rounded cross-sectional shape, such that at the intermediate plane 46, the pin 30 has the second cross-sectional shape. The sharp corners near the airfoil walls 14, 16 provide a higher pressure drop of the cooling fluid in relation to a pin with a uniformly rounded cross-sectional shape. The rounded shape at the intermediate plane 46 allows easy removal of flash, for example by an automated cutter, after the manufacture of the core. In FIG. 3, the white (un-shaded) area 80 between adjacent pins 30 represents the position of the core.

To ensure efficient use of the cooling fluid, the pins 30 may be designed to a) increase heat transfer from the airfoil walls 14 and 16 and b) limit the overall cooling flow by providing a high pressure drop. Since a higher pressure drop is observed to be associated with sharp corners, in some embodiments, a pin 30 may be designed to have a cross-sectional shape with relatively sharp corners for a major part of its length, and to transition to a cross-sectional shape with relatively rounded corners near intermediate plane 46 to facilitate flash removal. The inventors have observed that a rounded shape at the intermediate plane 46 may cause an increase in cooling flow in the region of the intermediate plane 46, which may affect the pressure drop and the heat transfer from the airfoil walls 14 and 16, compared to the rest of the pin 30.

Figure 4:
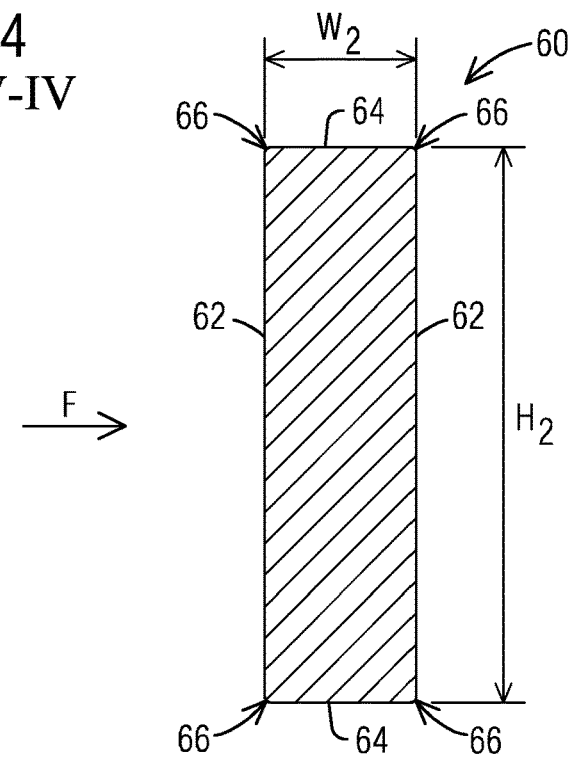
FIG. 4 shows a cross-sectional shape of the hybrid pin of FIG. 3 along a section IV-IV at an intersection of the pin with an airfoil wall.
Figure 10:
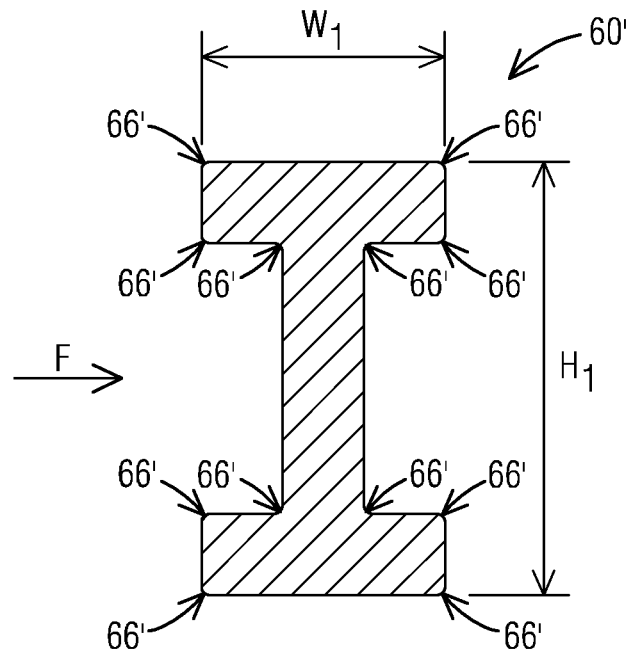
FIG. 10 and FIG. 11 show cross-sectional shapes respectively at an intersection with an airfoil wall and at an intermediate plane, of a hybrid pin according to a second embodiment.

A second feature of the hybrid pin 30 is that the cross-sectional area of the pin 30 increases in the region of the intermediate plane 46, such that the cross-sectional area of the pin 30 at the intermediate plane 46 (examples shown in FIGS. 5 and 11) is greater than a cross-sectional area of the pin 30 at the respective intersections 42, 44 (examples shown in FIGS. 4 and 10). Having a larger cross sectional area of the pin 30 at the intermediate plane 46, which is far from hot airfoil walls 14 and 16, recovers the aforementioned loss in pressure drop due to the rounding of the corners, and furthermore pushes the coolant flow towards the hot walls 14 and 16 thereby increasing the heat transfer from the airfoil walls 14 and 16. In the illustrated embodiment, the pin 30 is provided with a bulge or protuberance 40 around a portion of the pin 30 that is adjacent to the intermediate plane 40. The bulge 40 provides the aforementioned technical effect and thereby addresses both of the objectives a) and b) mentioned above.

Figure 5:
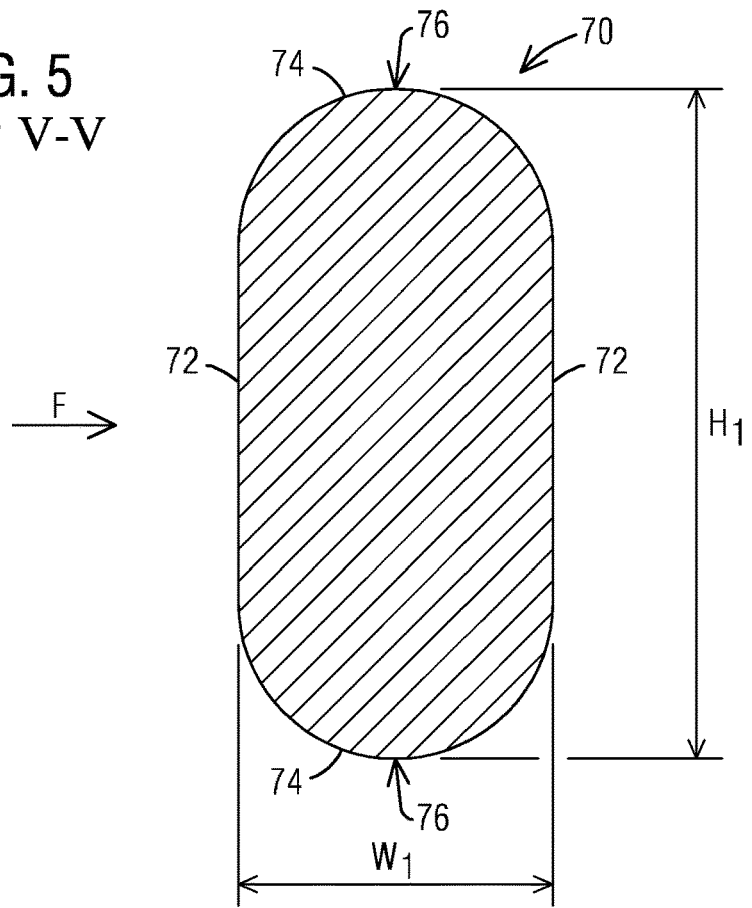
FIG. 5 shows a cross-sectional shape of the hybrid pin of FIG. 3 along a section V-V corresponding to an intermediate plane of the pin.

Referring now to FIGS. 4 and 5, according to a first example embodiment, the pin 30 may have a first cross-sectional shape 60 configured as a rectangle at the respective intersection 42, 44, and a second cross-sectional shape 70 configured as a racetrack at the intermediate plane 46. Each of the cross-sectional shapes 60, 70 is elongated in a direction orthogonal to a bulk flow direction F of the cooling fluid. In this case, the cross-sectional shapes 60, 70 are elongated in the radial or span-wise direction. Each shape 60, 70 is defined by a respective height $H_2$, $H_1$ and a respective width $W_2$, $W_1$ along orthogonal axes, which in this case extend in the radial and axial directions respectively. In each case, the height of the pin 30 is greater than the width.

As shown in FIG. 4, the rectangular cross-sectional shape 60 at the respective interface 42, 44 is defined by a first pair of parallel straight sides 62 extending radially and a second pair of parallel straight sides 64 extending axially. The sides 62, 64 intersect at right angles, the intersections being defined by relatively sharp corners 66. As shown in FIG. 5, the racetrack cross-sectional shape 70 at the intermediate plane 46 is defined by a pair of parallel straight sides 72 extending radially, which are joined at opposite ends by a pair of convex curves 74, which define relatively rounded corners 76 with a larger radius than the corners 66 of the rectangular cross-sectional shape 60. In general, the transition from a relatively sharp to a relatively rounded shape may involve an increase in radii of curvatures of the corners, with the rounded shape having corners with larger radii.

Figure 8:
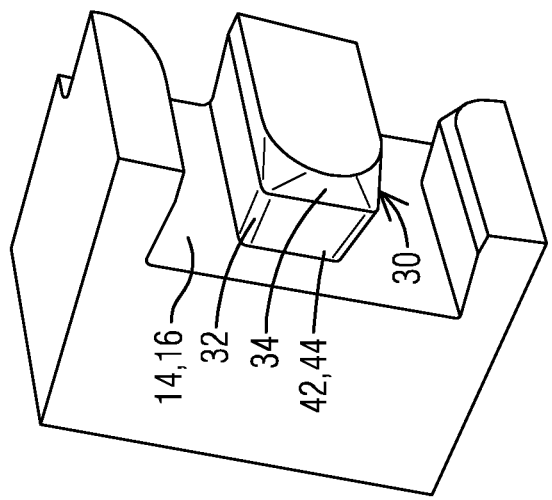
FIG. 6-8 illustrate further variants of a hybrid pin, each figure depicting a perspective view of a quarter portion of a pin cut along the intermediate plane.
Figure 7:
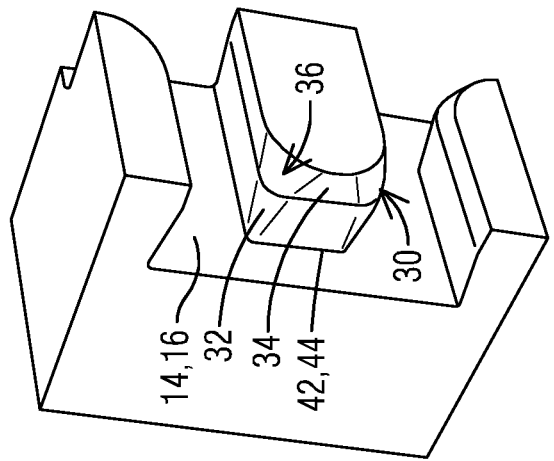
Figure 6:
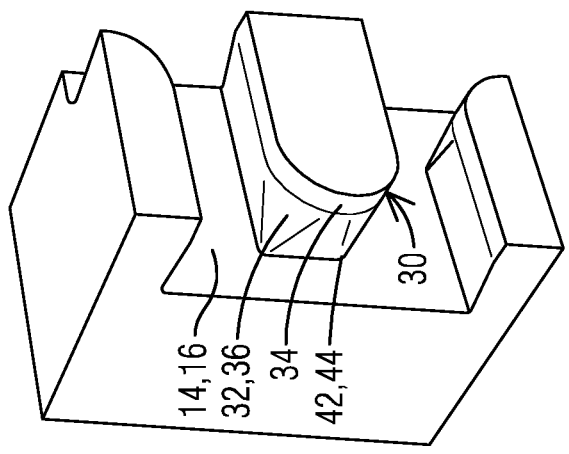

In principle, the transition from a sharp to a rounded shape may be implemented in a number of different ways. FIG. 6-8 illustrate some non-limiting examples of how the above may be achieved, with each design providing unique characteristics in connection with heat transfer and pressure drop.

FIG. 6-8 depict a quarter portion of a pin in each case, showing a perspective sectional view at the intermediate plane. In the embodiment shown in FIG. 6, the pin 30 includes a morphing region 36 where the shape of the pin transitions smoothly from a sharp to a rounded shape. In this case, the morphing region 36 is located at a first portion 32 of the pin 30 which is adjacent to the respective intersection 42, 44. At a second portion 34 adjacent to the intermediate plane 46, the pin 30 has a rounded cross-sectional shape (in this case, a race-track shape) extending up to the intermediate plane 46. In the embodiment shown in FIG. 7, the pin 30 has a morphing region 36 located at the second portion 34 of the pin 30 adjacent to the intermediate plane 46 where the shape of the pin 30 transitions smoothly from a sharp to a rounded shape, while at the first portion 32, the shape of the pin 30 comprises sharp corners. The embodiment of FIG. 8 is generally similar to that of FIG. 7, with one difference being that instead of a gradual or smooth morphing, the cross-sectional shape of the pin 30 transitions sharply or abruptly at the second portion 34 of the pin 30. In the embodiments of FIGS. 7 and 8, to provide maximum pressure drop and heat transfer, the first portion 32 of the pin 30 (having sharp corners) may extend for a predominant part of the length of the pin 30, for example, at least 70% of a length of the pin 30 between the intermediate plane 46 and a respective intersection 42, 44. The second portion 34 (including the transition) may extend for a remaining length of the pin 30 between the intermediate plane 46 and a respective intersection 42, 44. Although not shown in FIG. 6-8, a portion of the pin adjacent to the intermediate plane 46 may be provided with a bulge as shown in FIG. 3.

In one embodiment, as best shown in FIG. 3, at least a portion of the pin 30 (herein, the first portion 32 adjacent to the respective intersection 42, 44) may be provided with a taper 48 in a direction from the intermediate plane 46 toward the respective intersection 42, 44. The taper 48 may include, a straight taper (as shown in FIG. 3), or a curved taper (not shown). In various embodiments, the ratio of a width $W_1$ of the pin 30 at the intermediate plane 46 to a width $W_2$ of the pin 30 at a respective intersection 42, 44 may lie in the range 1.1 to 2. Furthermore, in various embodiments, the taper 48 and the bulge 40 may be employed in combination, as shown in FIG. 3, or individually (i.e., either a bulge or a taper).

Figure 9:
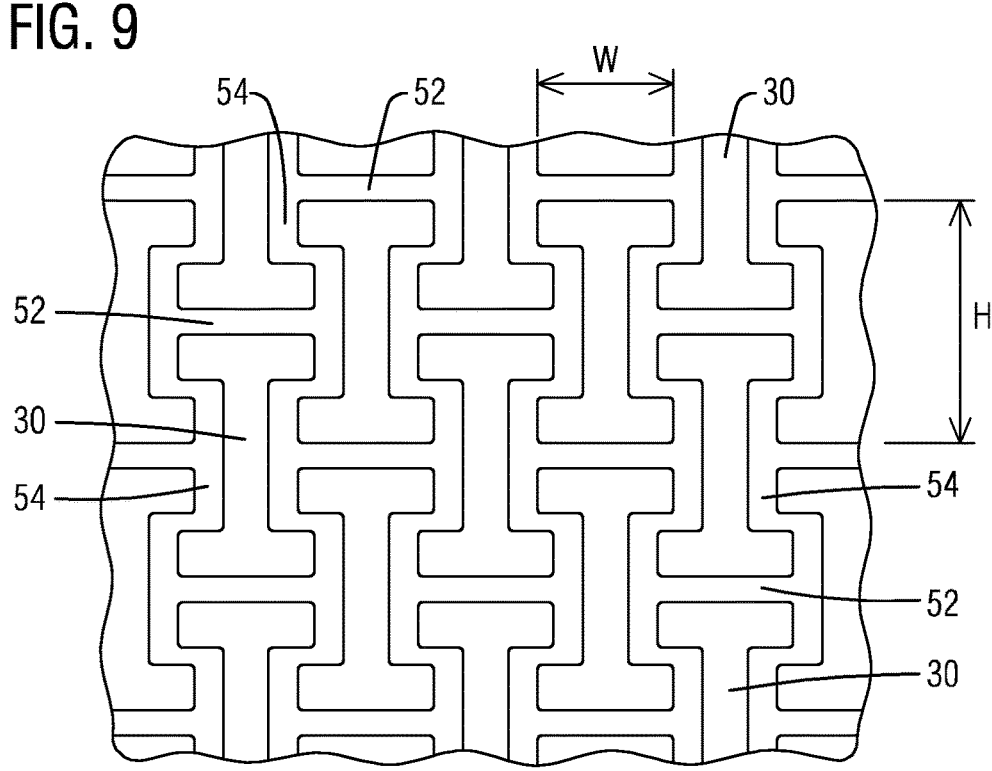
FIG. 9 is an internal cross-sectional view of a trailing edge portion of a turbine airfoil looking in a direction from the pressure side to the suction side, illustrating an array of pins according to a second example configuration.

FIG. 9 illustrates a pin array according to an alternate configuration. According to this second embodiment, hybrid pins 30 are employed that have the general cross-sectional shape of an I-beam. As in the previous embodiments, each pin 30 may extend from a first airfoil wall (e.g. a pressure side wall) to a second airfoil wall (e.g. a suction side wall) that delimit an internal cavity of the airfoil. The array may be formed of a large number of span-wise or radially extending rows of pins 30, the rows being arranged next to each other along the axial direction. The pins 30 of each row are spaced in the radial direction such that axially extending cooling channels 52 are defined between adjacent pins 30 of a row. The rows are spaced in the axial direction such that radially extending cooling channels 54 are defined between adjacent pins 30 of neighboring rows. The axial and radial channels 52, 54 extend (in cross-section) from the pressure side wall 14 to the suction side wall 16 and are fluidically interconnected to lead a pressurized cooling fluid in a generally axial direction toward the trailing edge exit slots. Each pin 30 may have a height dimension H and a width dimension W along orthogonal axes, such that the height dimension H is much larger than the width dimension W.

Figure 12:
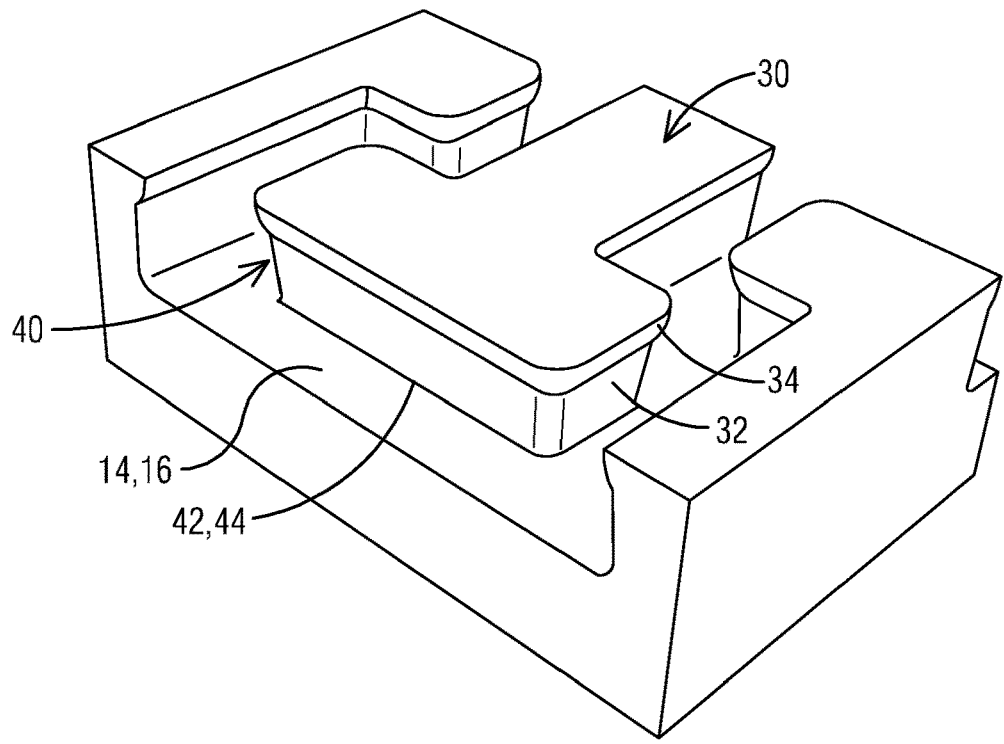
FIG. 12 depicts a perspective view of a quarter portion of a hybrid pin cut along the intermediate plane, according to the second embodiment.
Figure 11:
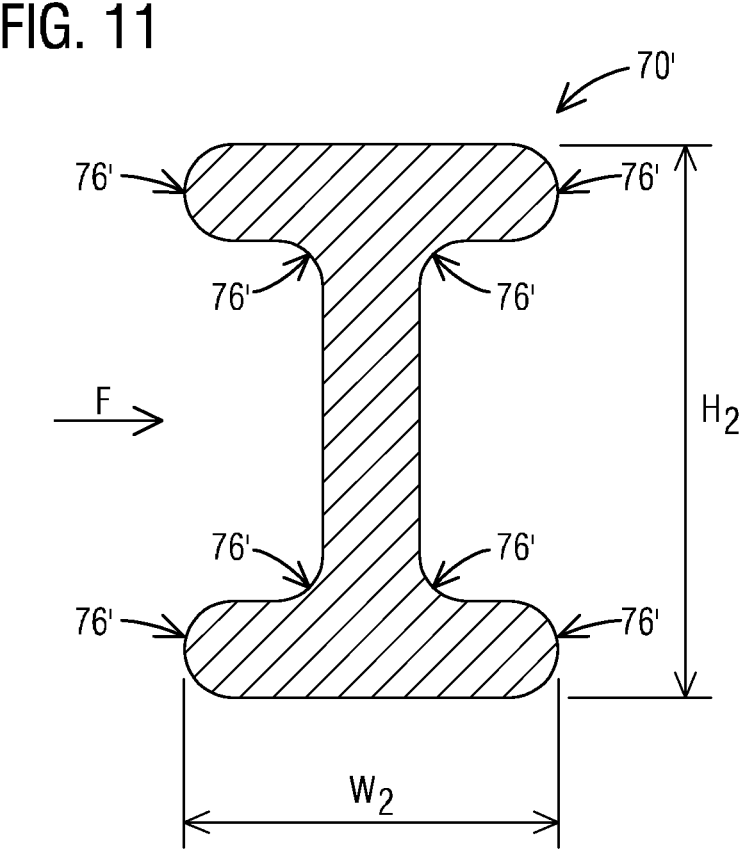

FIG. 10-12 illustrate an example of a hybrid I-beam pin 30. FIG. 10 and FIG. 11 show example cross-sectional shapes respectively at a respective intersection with an airfoil wall and at an intermediate plane of a hybrid pin according to the second embodiment. As shown in FIG. 10, the pin 30 has a first cross-sectional shape 60' at the respective intersection 42, 44 with one of the airfoil walls 14, 16. In this case, the cross-sectional shape 60' is a closed shape representing an I-beam defined by relatively sharp corners 66'. Referring to FIG. 11, the shape of the pin 30 transitions into a more rounded second cross-sectional shape 70' at the intermediate plane of the pin. The cross-sectional shape 70' at the intermediate plane 46 in this case is a closed shape representing an I-beam defined by more rounded corners 76'. The corners 76' at the intermediate plane have larger radii than the corners 66' at the respective intersection 42, 44. In general, the transition from a relatively sharp to a rounded shape may involve an increase in radii of curvatures of the corners, with the rounded shape having corners with larger radii. To recover a loss in cooling flow reduction due to the transition into a more rounded shape at the intermediate plane, the pin has larger cross-sectional area at the intermediate plane (see FIG. 11) than at the respective intersection 42, 44 (see FIG. 10). Each of the cross-sectional shapes 60', 70' is elongated in a direction orthogonal to a bulk flow direction F of the cooling fluid. Each shape 60', 70' is defined by a respective height $H_2$, $H_1$ and a respective width $W_2$, $W_1$ along orthogonal axes, which in this example extend in the radial and axial directions respectively. In each case, the height of the pin is greater than the width.

The transition from a sharp to a rounded shape may be implemented in a number of ways, similar to that described above in connection with the rectangular-racetrack hybrid pins. For example, the transition may be implemented by a smooth morphing region or a sharp transition. For increased heat transfer in addition to a high pressure drop, a portion of the pin 30 adjacent to the intermediate plane 46 may include a bulge 40, as shown in depicted in FIG. 12.

While specific embodiments have been described in detail, those with ordinary skill in the art will appreciate that various modifications and alternative to those details could be developed in light of the overall teachings of the disclosure. Accordingly, the particular arrangements disclosed are meant to be illustrative only and not limiting as to the scope of the invention, which is to be given the full breadth of the appended claims, and any and all equivalents thereof.

The invention claimed is:

1. An airfoil for a turbine engine, comprising:
    a first airfoil wall and a second airfoil wall delimiting an internal cavity,
    an array of pins positioned in the internal cavity, whereby cooling channels are defined in the interspaces between adjacent pins of the array,
    each pin extending lengthwise from the first airfoil wall to the second airfoil wall, the pin being connected to the first airfoil wall at a first intersection and connected to the second airfoil wall at a second intersection,
    wherein an intermediate plane perpendicular to a lengthwise direction is defined at a location between the first intersection and the second intersection,
    wherein the pin has a first cross-sectional shape at a respective intersection and a second cross-sectional shape at the intermediate plane,
    wherein the first cross-sectional shape includes a closed shape defined by relatively sharp corners and the second cross-sectional shape includes a closed shape defined by relatively rounded corners,
    wherein a cross-sectional area of the pin at the intermediate plane is greater than a cross-sectional area of the pin at the respective intersection.

2. The airfoil according to claim 1, wherein a portion of the pin adjacent to the intermediate plane includes a bulge.

3. The airfoil according to claim 1, wherein the pin includes a morphing region which the shape of the pin transitions smoothly from the first cross-sectional shape to the second cross-sectional shape.

4. The airfoil according to claim 1, wherein the shape of the pin transitions sharply from the first cross-sectional shape to the second cross-sectional shape at a location between the intermediate plane the respective intersection.

5. The airfoil according to claim 1, wherein at least a portion of the pin is provided with a taper in a direction from the intermediate plane toward the respective intersection.

6. The airfoil according to claim 1, wherein the pin comprises:
    a first portion adjacent to the respective intersection, wherein the pin comprises relatively sharp corners along the length of the first portion, and
    a second portion adjacent to the intermediate plane in which the shape of the pin transitions to include relatively rounded corners.

7. The airfoil according to claim 1, wherein a ratio of a width of the pin at the intermediate plane to a width of the pin at the respective intersections lies in the range 1.1 to 2.

8. The airfoil according to claim 1, wherein each of the cross-sectional shapes comprises an elongated shape, defined by a respective height and a respective width along orthogonal axes, the respective height being greater than the respective width.

9. The airfoil according to claim 8, wherein
    the first cross-sectional shape is a rectangle, and
    the second cross-sectional shape is a racetrack comprising a pair of parallel straight sides, which are connected at opposite ends by a pair of convex curves.

10. The airfoil according to claim 8, wherein
    the first cross-sectional shape is an I-beam defined by relatively sharp corners, and
    the second cross-sectional shape is a modified I-beam defined by rounded corners.

11. The airfoil according to claim 1, wherein the first airfoil wall is a pressure side wall and the second airfoil wall is a suction side wall.

12. The airfoil according to claim 11, wherein the internal cavity is located adjacent to a trailing edge of the airfoil.

13. The airfoil according to claim 12, wherein the array of pins comprises multiple rows of pins, each row extending along a span-wise direction of the airfoil, the rows being spaced from each other along a chord-wise direction of the airfoil, whereby chord-wise extending cooling channels are defined between adjacent pins in a row, and span-wise extending cooling channels are defined between pins in adjacent rows, the chord-wise extending cooling channels and the span-wise extending cooling channels being interconnected to lead a pressurized cooling fluid toward the trailing edge via a serial impingement on to said rows of pins.

14. The airfoil according to claim 13, wherein the pins of adjacent rows are staggered in the span-wise direction.

* * * * *